March 16, 1954  L. A. WERBE  2,672,361
SANDING DEVICE FOR AUTOMOTIVE VEHICLES
Filed Feb. 18, 1950
2 Sheets-Sheet 1
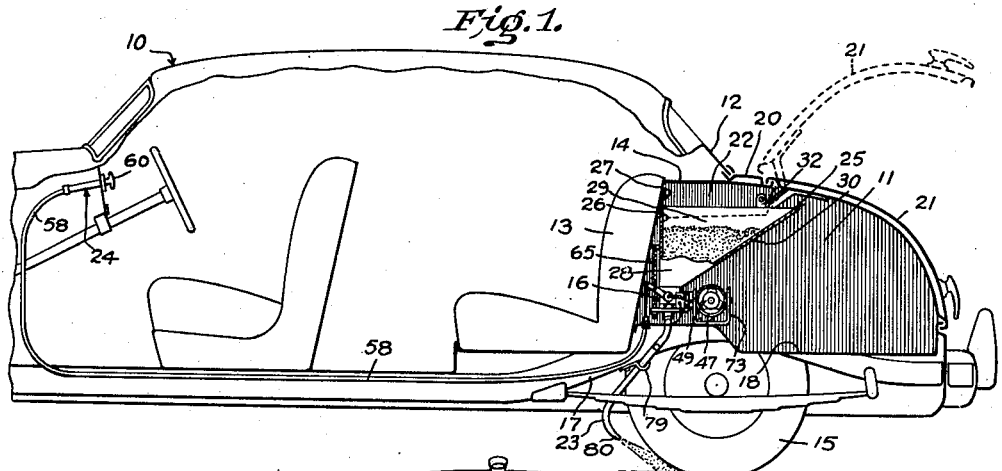
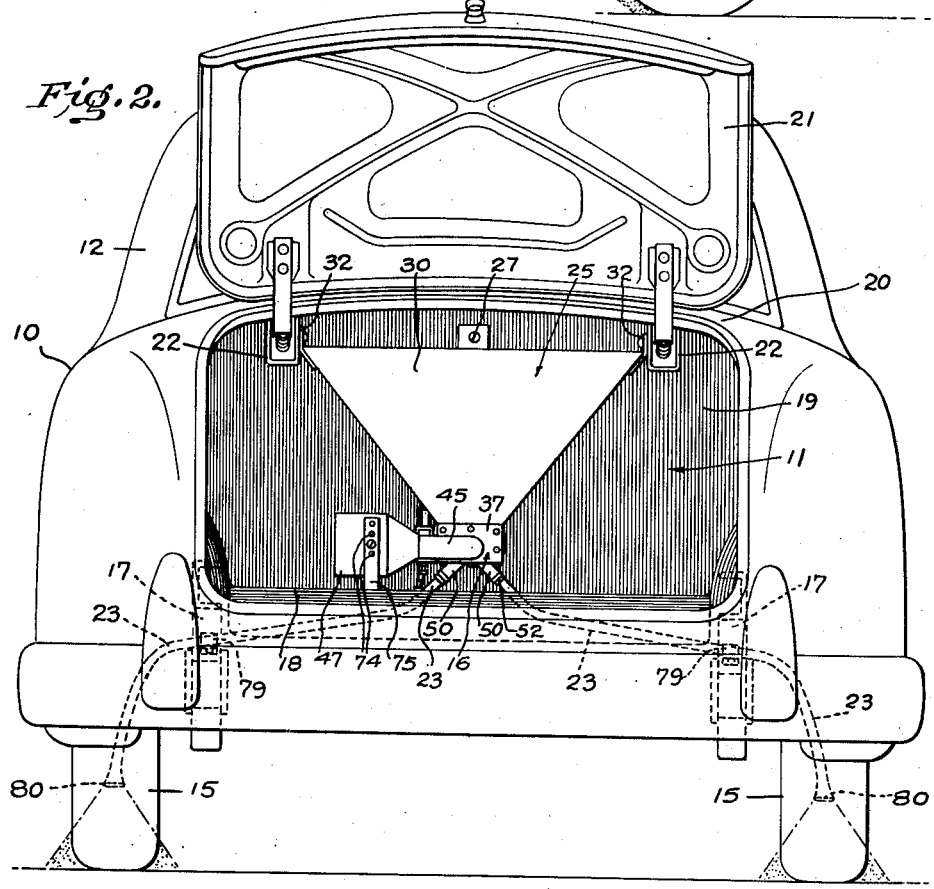
Louis A. Werbe
INVENTOR
BY Reginald W. Hoagland
ATTORNEY

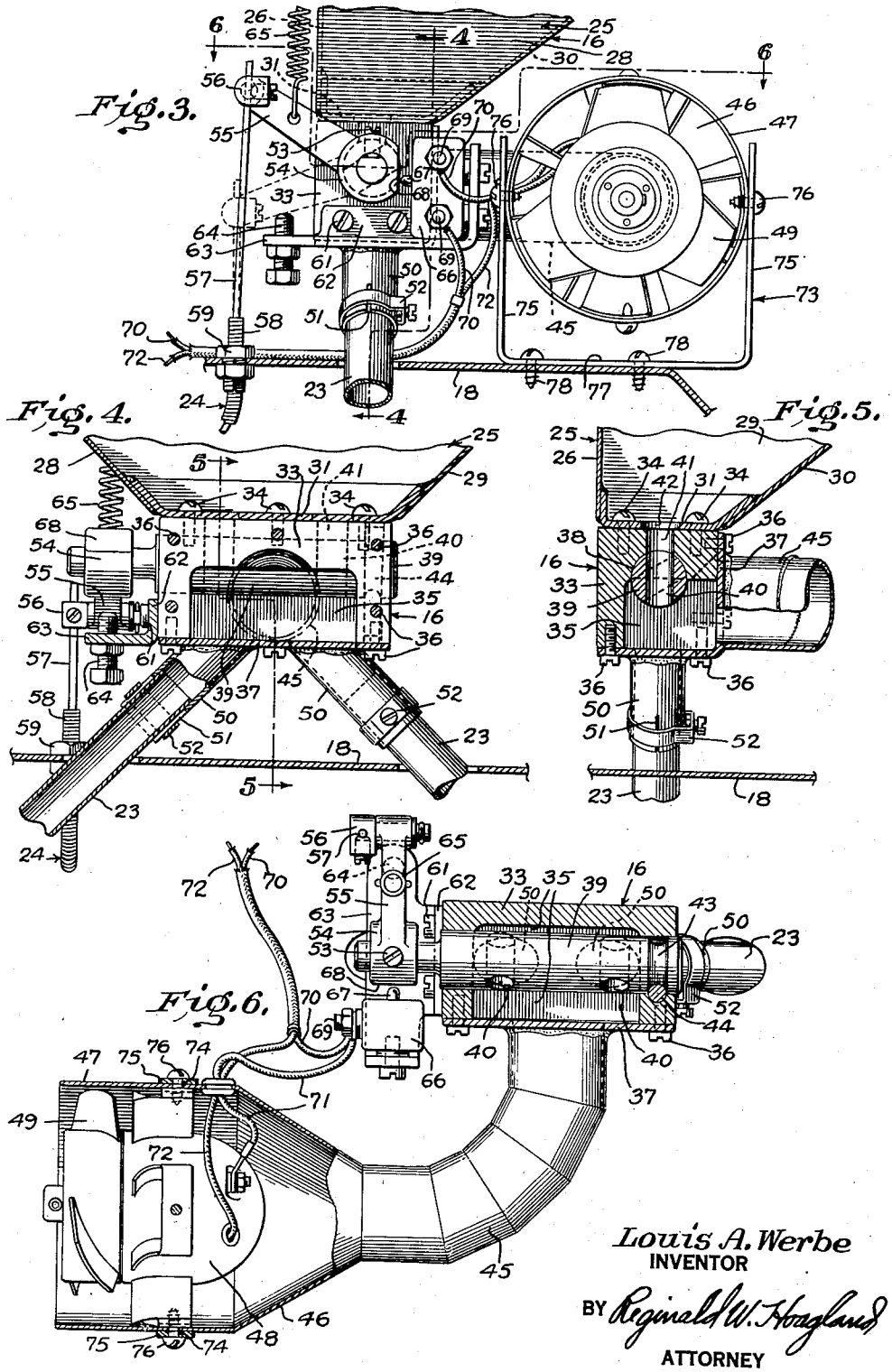

Patented Mar. 16, 1954

2,672,361

UNITED STATES PATENT OFFICE 2,672,361

SANDING DEVICE FOR AUTOMOTIVE VEHICLES

Louis A. Werbe, Flint, Mich.

Application February 18, 1950, Serial No. 144,997

2 Claims. (Cl. 291—3)

The present invention relates to sanding devices of the type used on motor vehicles for obtaining traction on slippery roadways, and aims to provide a novel and improved device of this character which applies sand or other gritty material to the roadway and drive wheels of the vehicle directly in advance of contact of the wheels with the roadway, which can be conveniently operated from the driver's seat while the vehicle is in motion, which is simple and substantial in construction, which can be manufactured economically, and which will be thoroughly efficient and practical in use.

Another object of the invention is to provide a sanding device in accordance with the preceding object which is of a construction and arrangement with respect to the construction of an automotive vehicle whereby the device will occupy a space in the vehicle at a location directly in back of the rear seat and substantially above and between the drive wheels of the vehicle so as to minimize the distances to the points of sand dispersement.

A further object of the invention is to provide a sanding device as set forth in the preceding objects wherein the device is supported in an elevated position above the floor of the trunk compartment and is provided with sand conducting conduits diverging immediately therefrom as they extend downwardly towards the rear wheels of the vehicle.

A further object of the invention is to provide a sanding device in conformity with the last above-mentioned object, wherein the sanding device is attached and supported in the elevated position by the baggage guards at the deck lid hinges of the trunk compartment.

A further object of the invention is to provide a sanding device in accordance with the preceding objects which may be readily applied to an automotive vehicle with the minimum of effort and labor and with least alterations of vehicle parts.

A further object of the invention is to locate a sanding device in the trunk compartment of an automotive vehicle where it occupies the minimum amount of space normally used for baggage, does not interfere with the loading and unloading of baggage in the trunk compartment, and where it can be conveniently refilled with sand upon raising the deck lid of the trunk compartment.

A still further object of the invention is the provision of a novel and improved sand controlling and pressure delivery mechanism having a common mixing chamber into which both sand and air are admitted separately and from which they are expelled together, said sand being deposited through a metering mechanism in equal amounts from a hopper into opposite ends of the mixing chamber and directly over sand and air outlet openings, while the air under pressure enters the chamber at a location between both sets of sand inlets and outlets for forcing the sand under pressure through the outlets.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a fragmentary side elevation and sectional view, parts being broken away, of the rear portion of an automotive vehicle illustrating the manner in which the sanding device of the present invention is applied thereto;

Figure 2 is a rear view of same with the hinged lid of the trunk compartment raised to show the sanding device in rear elevation;

Figure 3 is an enlarged side elevation of sanding device as shown in Figure 1 with parts broken away and in an inoperative position;

Figure 4 is a vertical section taken on line 4—4 of Figure 3 looking in the direction of the arrows with parts in operative positions;

Figure 5 is a vertical section taken on the line 5—5 of Figure 4 looking in the direction indicated by the arrows with the sand valve open; and Figure 6 is a horizontal sectional view taken substantially upon the plane of the section line 6—6 of Figure 3, looking in a downward direction when the device is not in operation.

Referring now more specifically to the accompanying drawings wherein like numerals designate similar parts throughout the various views, attention is directed first to Figures 1 and 2, wherein it will be seen that there is indicated at 10 the body of an automotive vehicle with the trunk compartment 11 thereof extending forwardly of the extreme rear portion of the top 12 to the seat 13, thus providing interiorly of the body the shelf or ledge 14 behind the seat and above the trunk compartment. The trend of modern automobile bodies is to position the rear seat forwardly of the rear wheels 15 for permitting both lowering and widening of said seat which necessarily increases the size of the trunk compartment in a forward direction. It is in this forward increased baggage space of the trunk compartment located substantially over and between the rear wheels that the main unit of my improved sanding device, indicated generally by the numeral 16, is especially designed for placement.

The automobile body is mounted on or otherwise supported by longitudinally extending members 17 of an underframe and has the trunk compartment 11 thereof also provided with a floor 18, a front wall 19 directly in back of the rear seat 13, deck 20, and hinged deck lid 21. Most bodies have the deck lid hinged to the deck by a pair of spaced hinges within the trunk compartment and therefore require a guard 22 about each hinge to protect baggage in the trunk compartment against engagement with said hinges during opening and closing of said compartment.

The improved sanding device forming the subject of this invention consists of the main sand containing and dispensing unit 16 which as previously stated is located in the forwardmost space allotted for baggage in the trunk compartment, sand delivering conduits 23 bent or formed in shapes to avoid structural parts of the automotive vehicle and to extend from the main unit 16 to locations directly in front of the rear wheels 15, and a control mechanism 24 connected to the main unit 16 and operable from the driver's seat of the vehicle for placing the device into and out of operation and for varying the amount of sand dispersed during operation thereof.

Reference is now also made to Figures 3, 4, 5, and 6 for an understanding of the construction of the sand containing and dispensing unit 16 of the sanding device.

The unit 16 has a sand hopper 25 constructed of sheet metal with one wall 26 thereof extending substantially vertical and attached to the forward wall 19 of the trunk compartment 11, as at 27, while the side walls 28 and 29 and the rear wall 30 are inclined as they extend downwardly to a relatively small rectangular bottom 31. On the opposite side walls 28 and 29 are secured tabs 32 for attachment to the guards 22 of the deck lid hinges. While the substantially vertical forward wall 26 of the sand hopper is located in close proximity to the forward wall 19 of the trunk compartment and the major portion of the open top of the hopper is below the ledge or shelf 14 and deck 20, the angle of inclination of the rear wall 30 of the hopper is such that a portion of said open top projects rearwardly into opening to the trunk compartment a sufficient distance to permit replenishing of sand to the hopper.

Should the unit 16 be of the type for attachment to an automotive vehicle after the manufacture thereof, metal screws may be used for supporting the hopper from the wall 19 and guards 22; however, should the unit be a part of the automotive vehicle body during the construction thereof, the walls of the hopper may be made of parts of the body construction.

The rectangular bottom 31 is constructed of relatively heavier material than are the walls of the hopper and has attached thereto and supported thereby a rectangular block 33 milled and drilled to form the main body portion of the previously mentioned sand dispensing mechanism. Screws 34 extending downwardly through apertures in the bottom 31 of the hopper and threaded into the block 33 comprise the means of attaching and supporting the block 33 to the hopper 25. Thus, hoppers of different sizes and shapes due to the size and construction of trunk compartments of different makes of automotive vehicles may be used with a standard design of sand dispensing mechanism.

To provide a sand and air mixing chamber 35 in the block, the lower portion of one side and adjoining portion of the bottom of said block are cut away the greater portions of the length, width, and height of said block, leaving merely attaching surfaces on said side and bottom completely surrounding said cut-away to which is attached, as at 36, an angle member 37 completely covering said side and bottom that have been cut away.

A cylindrical hole 38 extending lengthwise in the block through the undisturbed ends thereof and partly into the cut-away for the chamber 35 has rotatably mounted therein a valve pin 39 with a pair of parallel spaced transverse openings 40 therethrough for alignment with similar pairs of openings 41 and 42 in the block 33 and bottom 31 respectively upon turning movement of said pin, thus providing a rotary valve for controlling the flow of sand from the hopper 25 into opposite ends of the mixing chamber 35. In and adjacent one end of the valve pin 39 there is provided an annular groove 43 into which extends a tapered pin 44 driven into a similarly shaped hole in the block 33 for preventing end movement of the valve pin 39 during turning movement thereof. When the bottom 31 of the hopper is attached to the block 33, the tapered pin 44 is prevented from movement out of engagement in the groove 43 should it become loose.

On the portion of the angle 37 bolted to the side of the block 33, there is attached by welding, brazing, or the like, one end of a relatively large right angularly curved air conduit 45 that opens into the mixing chamber 35, while the other end of said conduit is formed with an enlarged cone-shaped portion 46 which in turn is connected to a relatively large cylindrical housing portion 47. Within the cylindrical housing 47 is mounted an electric motor 48 which rotates a fan 49 for drawing air into the cylindrical housing 47 and forcing said air around the motor, through the cone portion 46 and curved conduit 45, and into the mixing chamber 35, thus producing a blower. The location of the entrance of air from the conduit 45 into the mixing chamber 35 is substantially midway between the two entrances of sand through the openings 40 into the mixing chamber.

On the other portion of the angle 37 which closes the bottom of the mixing chamber 35 is attached a pair of diverging sand and air stub conduits 50, each of which opens into the mixing chamber directly beneath an entrance of sand into the chamber. It is to the ends of these stub conduits 50 that the sand delivering conduits 23 extending through apertures in the floor 18 of the trunk compartment are connected. The ends of the conduits 23 are shown within the split ends 51 of the conduits 50 and held in such positions by clamps 52 closing the split ends 51 thereon. While I have shown the conduits 23 within the conduits 50, it is to be understood that the ends of the conduits 23 may be split and clamped over the ends of smaller stub conduits 50.

A reduced end of the valve pin 39 extends for a short distance beyond one end of the block 33 and has attached thereto by a set-screw 53 an enlarged collar 54 with an arm 55 projecting radially therefrom for turning the valve pin in the block 33. Connected to the outer end of the arm 55, as at 56, is one end of a relatively stiff wire 57 extending beyond the end of a flexible tube 58 through which said wire is slidably supported. The end of the tube is fixed to the floor 18 of the trunk compartment after extending through an aperture in said floor by a split clamping element as shown at 59.

The flexible tube 58 with the wire 57 therein extends forwardly of the vehicle, as shown in Figure 1, and is connected to the instrument board of the vehicle, while the wire therein is connected to a manually operated button 60 similar in construction to that used on a choke for an engine. Thus, when the button 60 is pulled out or pushed in, the wire 57 will be slid in the tube 58 and the arm moved to turn the valve pin for controlling the dropping of sand from the hopper into the mixing chamber.

Secured by the screws 61 to the end of the block 33 from which the reduced end of the valve pin 39 extends is a flange 62 of a bracket 63 that supports an adjustable stop 64 for limiting downward swinging movement of the arm 55 when the rotary sand valve is in its extreme open position, while connected to said arm and to the forward wall 26 of the sand hopper for yieldably holding said arm in raised position with the valve closed is a spring 65.

The spring 65 may be of sufficient strength to exert enough pull to always close the valve when the button 60 at the instrument board is released or may be merely for the purpose of lifting the arm 55 and operating the valve to a closed position and thereby depending on a manual pushing action on the button 60 to overcome friction of the wire 57 in the flexible tube 58. The use of a spring with the last-mentioned amount of tension would permit the sand valve to remain fully or partly open upon release of the manually operated button 60 when the valve is in such open position.

Also mounted on the bracket 63 is a micro-switch 66 with the spring urged circuit making and breaking plunger 67 thereof positioned to be engaged and depressed by the collar 54 upon downward motion of the arm 55 to open the sand valve 39. The collar 54 has the outer cylindrical surface thereof interrupted with a flat portion 68 into which the plunger 67 is permitted to project and open the switch when the arm is in a position with the sand valve closed.

Connected to terminals 69 of the micro-switch 66 is one wire 70 leading to a source of current (not shown) and another wire 71 connected to a terminal on the motor 48 of the blower, while a third wire 72 also connected to the motor 48 and to the source of current will complete a circuit to the motor when the micro-switch is closed by depressing the plunger 67 thereof. Thus, as soon as the arm 55 is swung in a downward direction to partly or entirely open the sand valve, a circuit is closed to the motor of the blower.

For supporting the weight of the blower independent of the support of the remaining structure, a U-shaped bracket 73 is provided which has a number of spaced holes 74 in the two parallel leg portions 75 thereof, any of which may be selected for adjustment to insert metal screws 76 therethrough and into the cylindrical housing 47 for attaching the bracket to the housing. The portion 77 of the bracket which joins the two legs 75 thereof also is attached by metal screws 78 to a structural part of the vehicle, for example, the floor 81, as shown in Figures 1 and 3.

As previously stated, the location of the sand containing and dispensing unit 16 lengthwise of the automotive vehicle and with respect to the location of the rear wheels 15 thereof is such that the sand delivering conduits 23 need only to extend substantially sideways of the vehicle as they diverge downwardly to locations forward of said rear wheels. However, due to various locations of structural parts in different makes of automotive vehicles, it is necessary that the conduits 23 be formed in various shapes to avoid such structural parts and be supported on a part that does not have movement with respect to the body of the vehicle. Therefore, I have provided clips 79 to be attached on the undersides of the longitudinally extending members 17 of the underframe for engaging about the conduits 23 to support same near their sand dispersing ends.

By referring to Figure 2, it will be observed that the free ends of the conduits 23 are slightly flattened, as at 80, to oval shapes in cross section for producing a spray of sand of greater width than the height thereof to assure that sand will be sprayed to the sides of the wheels as well as in advance thereof.

While I have shown and described a sand containing and dispensing unit 16 of a construction for attachment to an automotive vehicle after the manufacture of the vehicle with a sand hopper of a size and shape for one make of vehicle, it is to be understood that the hopper, which is the supporting element for the dispensing mechanism, may be built into the body of the vehicle during the manufacture of said body and may be of any size or shape that will feed sand to the dispensing mechanism. For example, the sand hopper could be of such a size and shape that the dispensing mechanism supported thereby instead of being slightly above the floor of the trunk compartment as shown, could be located at a much higher elevation, thereby giving greater inclination to the sand delivering conduits 23 as they lead from the diverging stub conduits 50 to the points of sand dispersement.

From the foregoing, the construction of the sanding device will now be readily understood, and the operation thereof is as follows:

*Operation*

Assuming that the hopper 25 has dry, finely sifted sand therein and it is desired to obtain greater traction of the drive wheels of the vehicle with the roadway and thereby prevent skidding or spinning of the wheels, the mere pulling outward of the button 60 at the instrument board will cause sand under air pressure to be sprayed to the roadway and drive wheels directly in advance of contact of the wheels with the roadway.

Upon manual pulling of the button 60, the wire 57 is slid in the flexible tube 58 which pulls the arm 55 downwardly to register the ports 40 in the rotary valve with the openings 41 and 42 leading to the interior of the hopper thereby permitting sand to drop from the hopper into the opposite ends of the mixing chamber 35 directly over and into the opening to the stub conduits 50. Downward movement of the arm 55 also contacts the collar 54 of said arm with the plunger 67 of the micro-switch 66 and causes the plunger to be cammed inwardly closing the circuit to the motor 48 of the blower, which forces air under pressure into the mixing chamber 35 from one side thereof against the opposite side and between the two columns of dropping sand for maintaining like amounts of sand in opposite ends of the chamber and forcing the sand into and through the diverging stub conduits 50 and through the conduits 23.

As previously stated, the spring 65 may be of such strength that it will pull the arm 55 upward to close the sand valve and break the circuit to the motor of the blower upon release of the button 60 or may be of a tension not sufficient to overcome the friction of the wire 57 in the flexible tube 50, thereby causing the sanding device to remain in operation upon release of the button 60 and requiring that the button be pushed in to cause sanding device to cease operating.

In view of the foregoing description taken in conjunction with the accompanying drawings, it is believed that a clear understanding of the construction, operation, and advantages of the sanding device will be quite apparent to those skilled in this art, and that a more detailed description is accordingly deemed unnecessary.

It is to be understood, however, that even though there is herein shown and described a preferred embodiment of the invention, various changes may be made without departing from the spirit and full intendment of the invention.

Having described the invention, what is claimed as new is:

1. A sanding device for automotive vehicles comprising a sand hopper, a common air and sand mixing chamber beneath said hopper having an outlet opening at each end thereof, a rotary valve pin between said hopper and mixing chamber having a pair of spaced ports therein registrable with said hopper and in communication at all times with said mixing chamber through which columns of sand from said hopper drop into opposite ends of said mixing chamber at said outlet openings, conduits extending from said outlet openings to wheels of the vehicle, and a blower for supplying air under pressure to said mixing chamber between the two columns of sand dropping into the mixing chamber.

2. A sanding device for automotive vehicles comprising a sand hopper, an elognated air and sand mixing chamber beneath said hopper having an outlet opening at each end thereof, a rotary valve pin extending lengthwise of said mixing chamber beneath said hopper and partially arranged within said mixing chamber, said valve pin having a pair of spaced ports therein registrable with said hopper and in communication at all times with said mixing chamber through which columns of sand from said hopper drop into opposite ends of said mixing chamber at said outlet openings, conduits extending from said outlet openings to wheels of the vehicle, and a blower for supplying air under pressure to said mixing chamber, said air being directed against the underside of said valve pin and between the two columns of sand dropping into the mixing chamber.

LOUIS A. WERBE.

References Cited in the file of this patent

UNITED STATES PATENTS

| Number | Name | Date |
|---|---|---|
| 1,081,477 | Williams | Dec. 18, 1913 |
| 1,235,410 | Alheitt | July 31, 1917 |
| 1,277,333 | Meakin | Aug. 27, 1918 |
| 1,354,570 | Lamping | Oct. 5, 1920 |
| 1,646,130 | Waite | Oct. 18, 1927 |
| 1,657,960 | Ficana | Jan. 31, 1928 |
| 1,765,772 | Reese | June 24, 1930 |
| 1,784,832 | Florian | Dec. 16, 1930 |
| 1,850,795 | Hoffman | Mar. 22, 1932 |
| 1,955,307 | Morrison et al. | Apr. 17, 1934 |
| 2,033,322 | Boyer | Mar. 10, 1936 |
| 2,154,340 | Legoff et al. | Apr. 11, 1939 |
| 2,207,169 | Todd | July 9, 1940 |
| 2,239,518 | Gleason | Apr. 22, 1941 |
| 2,244,069 | Kook et al. | June 3, 1941 |
| 2,307,798 | Kook et al. | Jan. 12, 1943 |